UNITED STATES PATENT OFFICE 2,293,309

MALONIC ESTERS AS INSECTICIDES

Richard O. Roblin, Jr., Old Greenwich, and Ingenuin Hechenbleikner, Stamford, Conn., assignors to American Cyanamid Company, New York, N. Y., a corporation of Maine No Drawing. Application March 6, 1941, Serial No. 381,966

7 Claims. (Cl. 167—22)

The present invention relates to materials useful for destroying pests, such as insects and allied pernicious organisms, and deals with a new class of compounds which are particularly advantageous for the control of such pests.

We have found that the substituted and unsubstituted methylene malonic esters of the general formula:

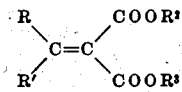

in which R is a member of the group consisting of hydrogen, aliphatic and aromatic radicals, R' is a member of the group consisting of hydrogen, aliphatic, substituted aliphatic, aromatic, substituted aromatic and aralkyl radicals, $R^2$ is a member of the group consisting of hydrogen, alkyl and aralkyl radicals and $R^3$ is a member of the group consisting of alkyl and aralkyl radicals, provide a new and effective means for controlling insects which are particularly difficult to exterminate, for example, the citrus red spider, *Tetranychus citri.*

As indicated by the above formula, the compounds employed in our invention may be either the mono or the diesters. The latter, that is, the neutral esters may be simple or mixed, as for example benzaldiethylmalonate or benzalethylbutylmalonate. The monoesters may be the acid esters or derivatives thereof, such as ester amides and the like. In other words, the ionizable hydrogen or the hydroxyl group of the acid ester may be replaced to form salts, amides and the like.

As showing the wide diversity of compounds which may be used in accordance with our invention, the following may be mentioned: benzaldibutylmalonate, benzalethylbutylmalonate, benzalethylhydrogenmalonate, benzaldi-2-ethylhexylmalonate, benzalethyldodecylmalonate, benzaldilaurylmalonate, benzalditetradecylmalonate, benzaltetradecylhydrogenmalonate, benzalamyloctadecylmalonate, benzaldioctadecylmalonate, benzaldibenzylmalonate, benzalbenzylhydrogenmalonate, benzalethylbenzylmalonate, benzalamylbenzylmalonate, 1-naphthaldiethylmalonate, 1-naphthalethylhydrogenmalonate, 1-naphthalethylbutylmalonate, citrylidenedibutylmalonate, o-chlorobenzaldiethylmalonate, α-n-amylcinnamaldiethylmalonate, p-chlorobenzaldiamylmalonate, furfuraldiamylmalonate, furfuralethylhydrogenmalonate, cinnamaldiethylmalonate, chlorylidenediethylmalonate, heptylidenediethlmalonate, crotylidenediethylmalonate, m-nitrobenzaldiamylmalonate, ethylidene-di-2-ethylhexylmalonate, cinnamalacetophenonediethylmalonate, methylenemethylbutylmalonate, methylenediethylmalonate, methylenelaurylhydrogenmalonate, isopropylidenediethylmalonate, isobutylidenediethylmalonate and vanillaldiethylmalonate.

The compounds of this invention are condensation products resulting from the reaction of a ketone or an aldehyde with an alkyl or aralkyl ester of malonic acid, for example, the reaction of benzaldehyde with diethylmalonate to form benzaldiethylmalonate may be represented by the equation:

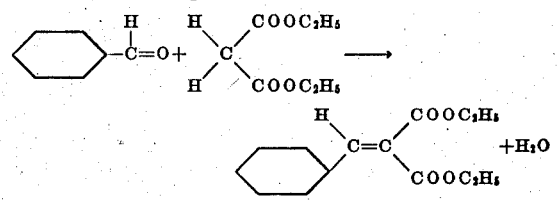

The following examples illustrate in detail the method of preparing these new insecticidal compounds. Materials employed are in parts by weight.

Example 1

35 parts of benzaldehyde and 50 parts of diethylmalonate were mixed together and cooled to 0° C. Two parts of piperidine were added as a catalyst. The mixture was allowed to stand for 48 hours at room temperature (20° C.). Water had separated at the end of this period. The mixture was then dissolved in ether, washed neutral (0.05% $H_2SO_4$), dried over sodium sulfate and distilled at reduced pressure. 70 parts of benzaldiethylmalonate were obtained as a colorless oily liquid boiling at 158° C. at 1 mm.

Example 2

To a mixture consisting of 24 parts of benzaldehyde and 60 parts of dibenzylmalonate cooled to 0° C., there were added 2 parts of piperidine. The reaction mixture was allowed to stand 24 hours at room temperature, after which it was treated according to the procedure of Example 1. The benzaldibenzylmalonate was recovered as a viscous yellow oil boiling at 270° C. at less than 1 mm. pressure.

Example 3

9.6 parts of furfural and 24.4 parts of diamylmalonate were mixed together and cooled in an ice bath. To this mixture were added 2 parts of piperidine. After standing for 24 hours at 20°–25° C. the reaction mixture was treated according to the procedure of Example 1. 30 parts (93% yield) of furfuraldiamylmalonate were obtained as a viscous light green oil (B. P. 147° C. at 0.5 mm.).

Example 4

A mixture consisting of 20 parts of vanillin, 22 parts of diethylmalonate and 1 part of piperidine was heated upon a steam bath for 4 hours. The viscous mixture was then allowed to stand 12 hours at room temperature. Crystallization began at the end of 12 hours and was complete in 24 hours. After recrystallization from alcohol, the vanillaldiethylmalonate was obtained as a colorless, odorless compound melting at 106°–107° C.

Spray solutions were prepared by dissolving the insecticidal compounds in a solvent medium consisting of 65% acetone and 35% water. Table 1 shows typical kills obtained under comparable conditions for the various dilutions when the sprays were used against the citrus red spider, *Tetranychus citri*, and the bean aphid, *Aphis rumicis*.

Table 1

| Insect | Compound | Dilution | Per cent kill |
|---|---|---|---|
| Red spider | Benzaldiethylmalonate | 1–1,000 | 100 |
| Do | do | 1–2,000 | 85.6 |
| Do | Benzaldibutylmalonate | 1–1,000* | 100 |
| Do | do | 1–2,000 | 99.5 |
| Do | Benzaldiamylmalonate | 1–1,000 | 100 |
| Do | do | 1–2,000 | 90 |
| Do | Benzaldi-2-ethylhexylmalonate | 1–500 | 100 |
| Do | do | 1–1,000 | 86.1 |
| Do | Benzaldibenzylmalonate | 1–500 | 100 |
| Do | do | 1–1,000 | 94 |
| Do | Furfuraldiamylmalonate | 1–500 | 100 |
| Do | do | 1–1,000 | 98.3 |
| Aphid | Benzaldiethylmalonate | 1–500 | 89.9 |
| Do | Benzaldiamylmalonate | 1–500 | 85 |
| Do | Benzaldi-2-ethylhexylmalonate | 1–500 | 100 |
| Do | do | 1–1,000 | 72.1 |
| Do | Furfuraldiamylmalonate | 1–500 | 75.2 |

*A 100% kill of the red spider eggs is obtained in conjunction with the 100% kill of the active forms.

The compounds of the present invention and particularly the neutral esters are characterized by increased toxicity in comparison with the ordinary neutral esters of malonic acid. Such activity is illustrated by the tests listed in Table 2, the compounds being applied in a solvent medium consisting of 65% acetone and 35% water.

Table 2

| Insect | Compound | Dilution | Per cent kill |
|---|---|---|---|
| Red spider | Diethylmalonate | 1–500 | 9.3 |
| Do | Benzaldiethylmalonate | 1–1,000 | 100 |
| Do | Dibutylmalonate | 1–1,000 | 65.8 |
| Do | Benzaldibutylmalonate | 1–2,000 | 99.5 |
| Aphid | Diethylmalonate | 1–500 | 5.9 |
| Do | Benzaldiethylmalonate | 1–500 | 89.9 |

While the compounds of our invention are especially effective as contact insecticides, they may be used also in preventing bacterial and fungal putrefaction of proteins, for the preservation of paints and for the control of fungous diseases on seeds and living plants.

In their application, it may be preferable or desirable to combine these pest-control materials with supplementary agents such as absorbent bodies, dispersing agents, sticking agents and the like. They may be applied as solutions in organic solvents, in aqueous dispersions, or in dusts with such inert solid diluents as walnut shell, wood flour, talc and the like.

While the invention has been described with particular reference to specific embodiments, it is to be understood that it is not to be limited thereto but is to be construed broadly and restricted solely by the scope of the appended claims.

We claim:

1. An insecticidal composition containing a toxic amount of a compound selected from the group consisting of organic esters of substituted and unsubstituted methylene malonic acids.

2. An insecticidal composition containing a toxic amount of a compound of the general formula:

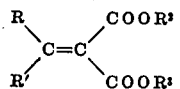

in which R is a member of the group consisting of hydrogen, aliphatic and aromatic radicals, R' is a member of the group consisting of hydrogen, aliphatic, substituted aliphatic, aromatic, substituted aromatic and aralkyl radicals, $R^2$ is a member of the group consisting of hydrogen, alkyl and aralkyl radicals and $R^3$ is a member of the group consisting of alkyl and aralkyl radicals.

3. An insecticidal composition containing a toxic amount of an organic ester of benzal malonic acid.

4. An insecticidal composition containing a toxic amount of a compound of the formula:

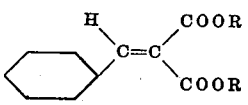

in which both R's represent the same member of the group consisting of alkyl and aralkyl radicals.

5. An insecticidal composition containing a toxic amount of benzaldibutylmalonate.

6. An insecticidal composition containing a toxic amount of benzaldi-2-ethylhexylmalonate.

7. An insecticidal composition containing a toxic amount of benzaldibenzylmalonate.

RICHARD O. ROBLIN, Jr.
INGENUIN HECHENBLEIKNER.